United States Patent
Straub

(10) Patent No.: US 7,150,410 B1
(45) Date of Patent: Dec. 19, 2006

(54) METHOD FOR PROVIDING A CONTROLLED INJECTION RATE AND INJECTION PRESSURE IN A FUEL INJECTOR ASSEMBLY

(75) Inventor: Robert D. Straub, Lowell, MI (US)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 10/724,480

(22) Filed: Nov. 28, 2003

Related U.S. Application Data

(63) Continuation-in-part of application No. 09/245,106, filed on Jan. 29, 1999, now abandoned.

(51) Int. Cl.
F02D 1/06 (2006.01)

(52) U.S. Cl. .......................... 239/5; 239/88; 239/533.7

(58) Field of Classification Search ................ 239/5, 239/88, 93, 95, 96, 533.7
See application file for complete search history.

(56) References Cited

U.S. PATENT DOCUMENTS

| | | | |
|---|---|---|---|
| 3,836,080 A | 9/1974 | Butterfield | |
| 4,378,774 A | 4/1983 | Kato | |
| 4,618,095 A | 10/1986 | Spoolstra | |
| 4,684,067 A | 8/1987 | Cotter et al. | |
| 4,741,478 A | 5/1988 | Teerman et al. | |
| 4,867,128 A | 9/1989 | Ragg et al. | |
| 5,072,882 A | 12/1991 | Taue et al. | |
| 5,219,122 A | 6/1993 | Iwanaga | |
| 5,494,219 A | 2/1996 | Maley et al. | |
| 5,634,448 A | 6/1997 | Shinogle et al. | |
| 5,687,693 A | 11/1997 | Chen et al. | |
| 5,788,154 A | 8/1998 | Beatty | |
| 5,839,412 A | 11/1998 | Stockner et al. | |
| 5,873,526 A | 2/1999 | Cooke | |
| 5,954,487 A | 9/1999 | Straub et al. | |
| 6,158,419 A | 12/2000 | Jett et al. | |

FOREIGN PATENT DOCUMENTS

| | | |
|---|---|---|
| EP | 1 055 814 A2 | 11/2000 |
| GB | 760852 | 11/1956 |
| SE | 134363 | 12/1948 |
| WO | WO 00/34644 | 6/2000 |

Primary Examiner—Christopher Kim
(74) Attorney, Agent, or Firm—Brooks Kushman P.C.

(57) ABSTRACT

A method for controlling injection rate and injection pressure of an electromagnetic fuel injector assembly having a pressure balanced control valve including a solenoid and a valve member subject to the pressure developed by the injector and actuated by the solenoid to close the valve member against the biasing force of a spring. The control valve is supported in a valve bore in an injector body. The method includes the step of providing a first level of current to the solenoid for moving the valve member from an open to a closed position allowing the pressure in the injector to rise, providing a regulated current to the solenoid at preselected times during the injector event to unbalance the forces acting on the valve member thereby slightly unseating the valve member to regulate injection pressure and injection rate of the fuel injector, and ending solenoid current delivery thereby moving the valve member to its open position.

7 Claims, 3 Drawing Sheets

METHOD FOR PROVIDING A CONTROLLED INJECTION RATE AND INJECTION PRESSURE IN A FUEL INJECTOR ASSEMBLY

CROSS-REFERENCE TO RELATED APPLICATION

This application is a continuation-in-part of U.S. application Ser. No. 09/245,106, filed Jan. 29, 1999 now abandoned, entitled "Method and Apparatus for Providing a Controlled Injection Rate and Injection Pressure in a Fuel Injector Assembly", now abandoned. Applicant claims the benefit of that application.

BACKGROUND OF THE INVENTION

1. Field of the Invention

The invention relates generally to a method for controlling injection rate and injection pressure in an electromagnetic fuel injector. More specifically, the invention relates to a method for controlling injection rate and injection pressure by varying current to a solenoid-actuated control valve to improve the operational characteristics of the fuel injector.

2. Background Art

Fuel injector assemblies are employed in internal combustion engines for delivering a predetermined, metered mixture of fuel and air to the combustion chamber at preselected intervals. In the case of compression ignition engines and diesel engines, the fuel/air mixture is delivered at relatively high pressures. Presently, conventional injectors deliver this mixture at pressures as high as 32,000 psi. These fairly high pressures require considerable engineering attention to ensure the structural integrity of the injector, good sealing properties, and the effective atomization of the fuel within the combustion chamber. However, increasing demands for greater fuel economy, cleaner burning, fewer emissions and $NO_x$ control have placed, and will continue to place, even higher demands on the engine's fuel delivery system, including increasing the fuel pressure within the injector.

Fuel injectors presently employed in the related art typically include a high pressure fuel passage, which extends between a solenoid-actuated control valve and the plunger cylinder in the injector body. Fuel at relatively low pressure is supplied to the control valve, which then meters the delivery of the fuel at very high pressures and at predetermined intervals through the high pressure fuel passage to the plunger cylinder. The fuel ultimately exits the injector through a fuel nozzle.

The solenoid-actuated control valve is supported in a stepped bore which typically extends through a side body of the injector. The stepped bore defines a supply chamber and a valve bore. The valve bore receives a valve stem of the associated control valve. The valve bore may terminate in a chamfered valve seat. Similarly, the valve stem may terminate in a head that seats against the valve seat under the force generated by the solenoid. The head is configured to mate closely with the valve seat. At least a portion of the valve stem is subject to the high pressure generated in a valve opening direction during an injection cycle. Accordingly, the solenoid must generate sufficient force in the valve closing direction to overcome such pressure. These forces are borne by the valve seat through the head of the control valve.

While the design and operation of fuel injections have continued to progress, there remains a constant need to improve fuel economy and reduce emissions while at the same time reducing engine noise induced from the operation of the fuel injector.

SUMMARY OF THE INVENTION

The invention results in improvements in the design and operation of fuel injectors of the related art. More specifically, the invention includes a method for controlling an electromagnetic fuel injector assembly for an internal combustion engine. The fuel injector assembly includes an injector body having a control valve in fluid communication with a source of fuel for metering predetermined quantities of fuel to a nozzle assembly. The control valve is supported within a valve bore in the injector body and includes a solenoid connected to a source of electrical current and a valve member operatively connected to the solenoid and subject to the pressures developed in the injector for moving the valve member against a biasing force between open and closed positions. The valve bore includes a relieved portion. The solenoid responds to control signals developed by an electronic processor controlled by software using an algorithm with input variables determined by engine operating conditions. A regulated current for the solenoid from a source of electrical current is developed at preselected times during an injection event to slightly unseat the valve in response to forces acting on the valve member in the valve opening direction to regulate the injection pressure and the injection rate of the fuel injector assembly. The valve member or the valve bore may include a relieved portion, which results in a reduced surface area contact between the valve head and the valve seat.

The method includes the step of providing a first level of regulated current to the solenoid actuator to cause the valve to partially seal the high pressure nozzle assembly passage from a fluid pressure spill passage, thereby allowing the regulated pressure in the nozzle assembly to rise to an initial injection pressure. A reduced level of regulated current then reduces the sealing force of the valve to create a reduced initial injection pressure. An increased level of regulated current greater than the first level then allows the regulated pressure to rise to a peak value and create a peak injection rate controlled period near the end of the injection event. That is followed by controlling the current to effect a controlled decrease in injection pressure and injection rate at the end of the injection event.

One advantage of the present invention is that the method controls the injection rate and injection pressure of the electromagnetic fuel injector assembly for calibrated injection times using software to control the levels of current directed to the solenoid during calibrated pressure regulation and to control the duration of the regulation.

Another advantage of the present invention is that by controlling the initial injection rate in diesel engines, the initial combustion rates may be reduced to lower engine noise and reduce $NO_x$ emissions.

Still another advantage of the present invention is that by regulating the maximum injection pressure, the cam and plunger associated with the injector assembly may be sized to provide high injection pressures at low speed and load thereby improving fuel economy and reducing soot formation while, at the same time, preventing excessive structural loads at higher speeds and loads through the pressure regulation function.

Still another advantage of the present invention is that the depressurization rate of the fuel injector may be controlled. More specifically, reducing the depressurization rate or spill rate reduces the mechanically induced engine noise caused by the rapid unloading of the drive system. This feature is applied by the present invention by lowering the current to the solenoid at the end of the injection event thereby slightly unseating the valve member prior to fully terminating the current to the solenoid. By regulating the current to the solenoid at the end of the injection event, the acceleration forces acting on the valve member in the valve opening direction may be reduced resulting in a reduced depressurization rate.

BRIEF DESCRIPTION OF THE DRAWINGS

Other advantages of the invention will be readily appreciated as the same becomes better understood by reference to the following detailed description when considered in connection with the accompanying drawings, wherein:

FIG. 2a is a partial cross-sectional side view of a conventional valve member of a solenoid-actuated control valve for an electromagnetic fuel injector;

FIG. 2b is an enlarged, partial cross-sectional side view of the valve member illustrated in FIG. 2a;

FIG. 2c is a partial cross-sectional side view of a valve member of a solenoid-actuated control valve for the present invention illustrating a relieved portion in the valve bore thereof;

FIG. 2d is an enlarged, partial cross-sectional side view of the valve member of FIG. 2c;

FIG. 2e is a partial cross-sectional side view of a valve member of a solenoid-actuated control valve of the present invention illustrating the relieved portion on the head of the valve member;

FIG. 2f is an enlarged, partial cross-sectional side view of the valve member of FIG. 2d.

DETAILED DESCRIPTION OF THE PREFERRED EMBODIMENTS

Figure 1:
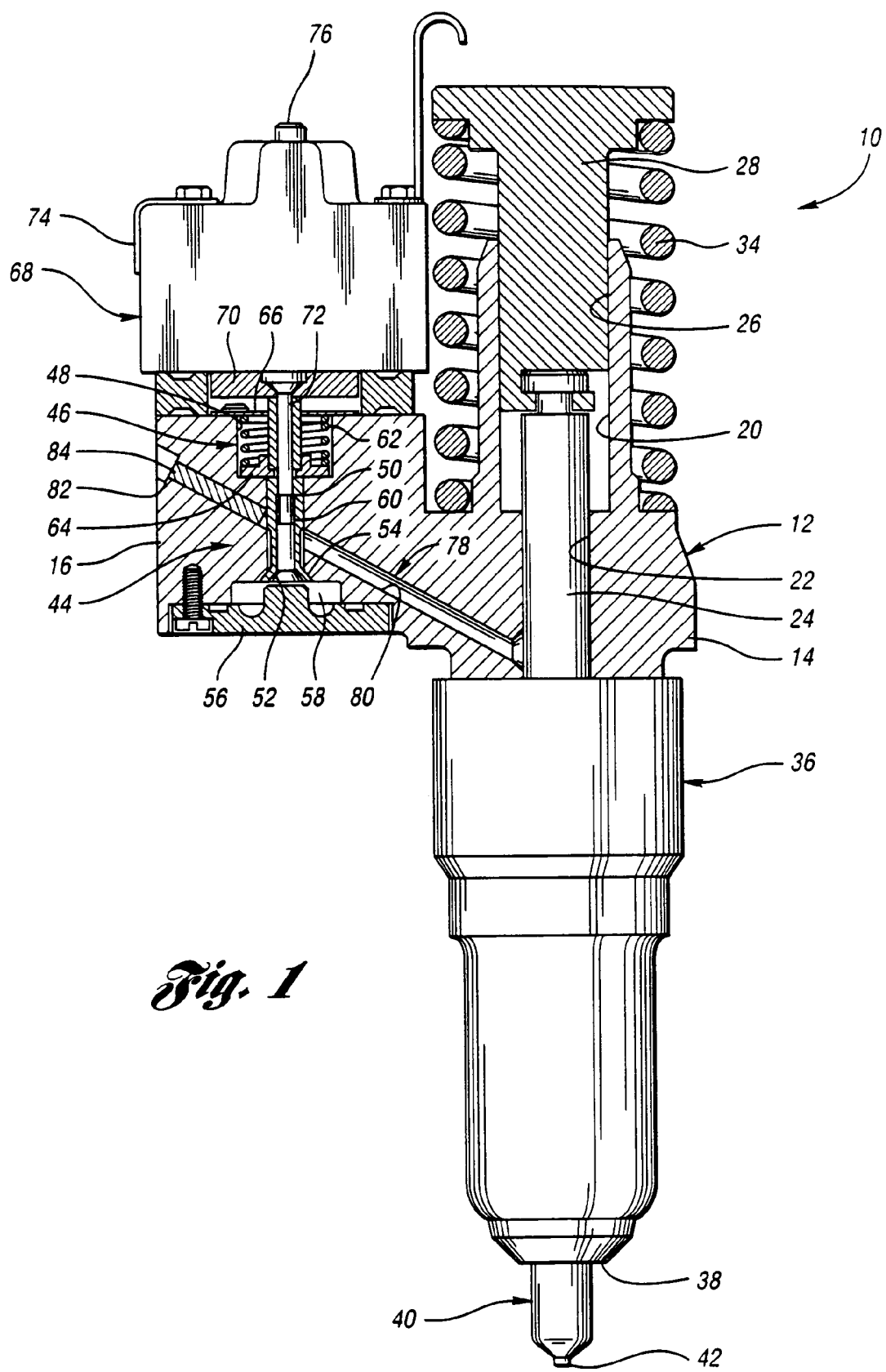
FIG. 1 is a partial cross-sectional side view of an electromagnetic fuel injector.

Referring to FIG. 1, there is generally shown at 10 an electromagnetic fuel injector assembly of the type commonly employed in injectors with an internal combustion engine wherein fuel is injected into a plurality of cylinders where it is combusted to generate power to rotate a crankshaft. More specifically, fuel injector assembly 10 shown in FIG. 1 has an electromagnetically-actuated, pressure-balanced control valve incorporated therein to control fuel discharge from the injector nozzle portion of assembly 10 into a cylinder of the engine (not shown) in a manner to be described. As illustrated in this figure, the electromagnetic fuel injector assembly 10 includes an injector body 12, which has a vertical main body portion 14 and a side body portion 16. The main body portion 14 includes a stepped, cylindrical bore 20 therethrough. The stepped, cylindrical bore 20 includes a pump cylinder 22, which slidably receives a pump plunger 24. In addition, the stepped, cylindrical bore 20 includes an upper wall 26 of larger internal diameter to slidably receive a plunger actuator follower 28. The plunger actuator follower 28 extends out one end of the main body 14 whereby it and the pump plunger 24 connected thereto are adapted to be reciprocated by an engine driven cam or rocker as known in the art. A stop pin (not shown) extends through an upper portion of the main injector body portion 14 into an axial groove in the plunger actuator follower 28 to limit upward travel of the follower under the bias of a plunger return spring 34.

A nut, generally indicated at 36, is threaded to the lower end of the main body portion 14 and forms an extension thereof. The nut 36 has an opening 38 at its lower end through which extends the lower end of a combined injector valve body or nozzle assembly, generally indicated at 40. The nozzle assembly 40 includes a spray tip 42. The nozzle assembly 40 may include a number of elements, which are well known in the art and which form no part of the present invention. Accordingly, the inner workings of the nozzle assembly 40 will not be described in detail here.

The delivery of fuel from a source such as a fuel tank to the nozzle assembly 40 is controlled by means of a solenoid-actuated, pressure-balanced valve, generally indicated at 44 in the side body portion 16. The side body portion 16 is provided with a stepped vertical valve bore, generally indicated at 46, which defines a supply chamber 48 and an intermediate or valve stem guide portion 50. The guide portion 50 of the valve bore 46 terminates in a valve seat 52. The valve seat 52 is chamfered so as to define an angle relative to the centerline of the valve bore 46. The valve 44 is received within the stepped vertical valve bore 46 and includes a valve member having valve stem 60 terminating in a head 54, which seats against the valve seat 52. The stem 60 extends upward from the head 54. A closure cap 56 is mounted to the underside of the side body portion 16 and forms therewith a spill chamber 58.

The valve 44 is normally biased in a valve opening direction, downward with reference to FIG. 1, by means of a coil spring 62, which loosely encircles the valve stem 60. One end of the spring 62 abuts against a washer-like spring retainer 64 encircling the valve stem 60. The other end of the spring 62 abuts against the lower face of a spring retainer 66. Movement of the valve 44 in the valve closing direction, upward with reference to FIG. 1, is effected by means of a solenoid assembly, generally indicated at 68. The solenoid assembly 68 includes an armature 70 having a stem 72 depending centrally from its head. The armature 70 is secured to the valve 44.

As commonly known in the art, the solenoid assembly 68 may further include a stator assembly having an inverted cup-shaped solenoid case 74. A coil bobbin supporting a wound solenoid coil and a segmented multi-piece pole piece are typically supported within the solenoid case 74. The solenoid coil is connected through electrical connectors 76 to a suitable source of electrical power via a fuel injection electronic control circuit (not shown) under the control of a software algorithm using input variables that are determined by engine operating conditions. Thus, the solenoid coil can be energized as a function of engine operating conditions, as will be described in greater detail below.

A high pressure fuel passage, generally indicated at 78, provides fluid communication between the control valve 44 and the fuel nozzle assembly 40. As shown in FIG. 1, the fuel passage 78 is formed by drilling a hole from one side of the side body portion 16 of the injector body 12 and between control valve 44 and the stepped cylindrical bore 20. In this way, the fuel passage 78 defines a delivery portion 80 extending between the control valve 44 and the stepped cylindrical bore 20 and a portion 82 extending between the valve stem guide portion 50 in the control valve 44 and the side body portion 16. A plug 84 seals the open end of the portion 82 of the high pressure fuel passage 78.

As illustrated in FIG. 1, the valve member, including the valve stem 60 and at least a portion of the head 54, are subject to high pressure via the delivery portion 80 of the fuel passage 78 developed by the injector. Thus, when energized, the solenoid assembly 68 moves the valve member toward the closed position against the biasing force of the spring 62 and the pressures acting on the valve member via the fuel passage 78.

Figures 2A, 2B, 2C, 2D, 2E, 2F:
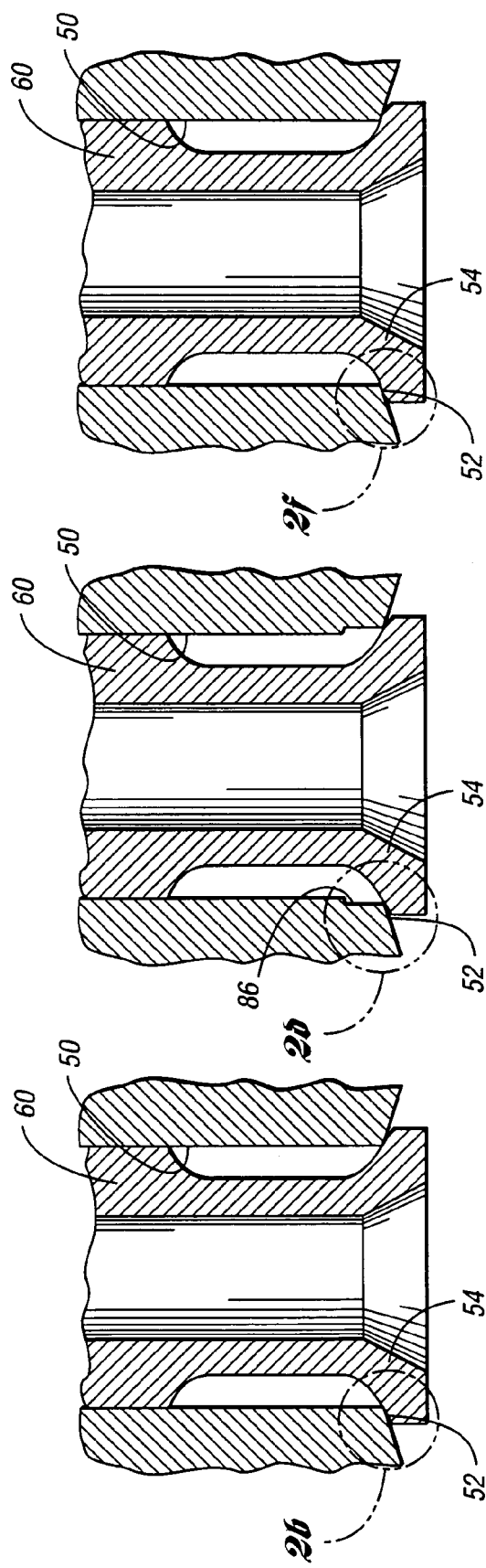

Referring now to FIGS. 2a and 2b, a conventional valve member movably supported in the guide portion 50 of the valve bore 46 is disclosed. The head 54 of the valve member is held against the valve seat 52 and against forces acting on the valve in the valve opening direction by the solenoid assembly 68. However, as shown in FIGS. 2c and 2d, the guide stem portion 50 of the valve bore 46 may include a relieved portion 86, which is subject to the pressures developed in the injector to provide forces acting on the valve member in the valve opening direction. Alternatively, as shown in FIGS. 2e and 2f, the head 54 of the valve 44 may include a relieved portion 90, which results in reduced surface area contact between the head 54 and the valve seat 52. Either of the relieved portions 86 on the guide stem portion 50 of the valve bore 46 or the relieved portion 90 on the head 54 of the valve member may be employed to balance the control valve 44 in the following manner.

Figure 3:
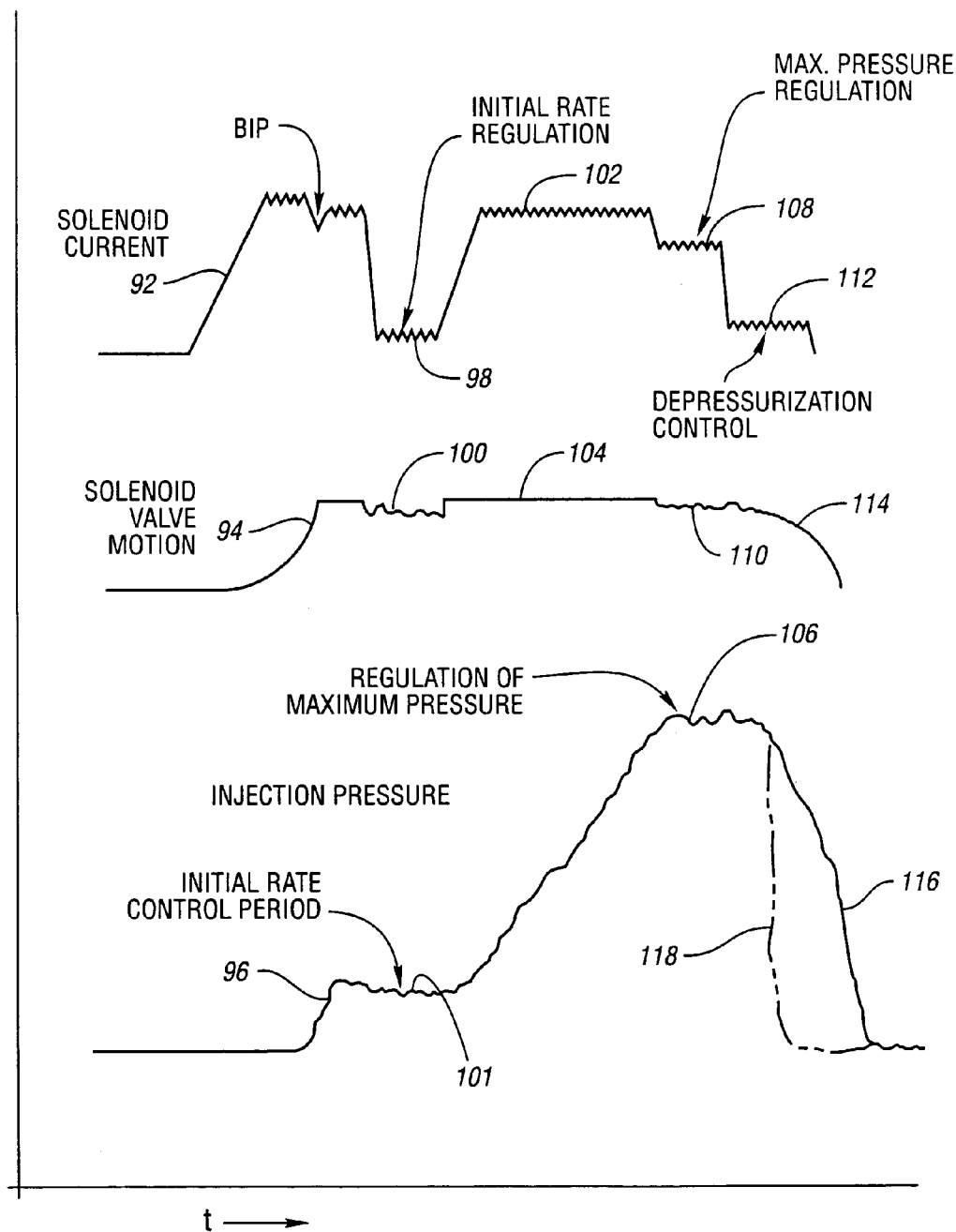
FIG. 3 is a graphical representation of the movement of the control valve as a function of solenoid current with reference to the injection pressure over time.

During any given injection event, the solenoid assembly 68 may be subject to reduced current from the source of electrical current at preselected times to slightly unseat the valve member in response to the forces acting on the valve member in the valve opening direction and, in this way, to regulate the injection pressure and injection rate of the fuel injector. More specifically, and referring now to the graphs of FIG. 3, the movement of the control valve 44 as a function of the solenoid current is illustrated with reference to the injection pressure over time. As noted above, initiation of current at 92 supplied to the solenoid moves the control valve 44 in the valve closing direction as indicated at 94. The pressure in the injector begins to rise as shown at 96. Employing the method of the present invention, during the initiation of the injection pressure, the current to the solenoid may be reduced at 98 to slightly unseat the valve member represented at 100 thereby controlling the rate of injection of the fuel and fuel pressure as indicated at 101. The current to the solenoid may then be increased again as indicated at 102 thus moving the valve member to its closed position as indicated at 104.

Thereafter, when the pressure in the injector approaches the peak injection pressure as indicated at 106, the level of current to the solenoid may be reduced as indicated at 108 to slightly unseat the valve member as indicated at 110 thereby regulating the maximum pressure in the injector. At the end of the injection cycle, the level of current to the solenoid may again be reduced as indicated at 112 to slowly unseat the valve assembly shown at 114 thereby controlling depressurization of the injector as indicated at 116. More specifically, the rate of depressurization at 116 is slowed when compared with the depressurization of conventional injectors shown in dotted lines at 118. Finally, once the injection event is completely over, the current to the solenoid is ended thereby moving the valve member to its open position under the influence of the spring 62 and any pressure existing in the fuel passage 78.

In this way, the injection rate and injection pressure in the electromagnetic fuel injector assembly may be controlled. The length of injection time and the level of current directed to the solenoid during the regulation modes determines the level of pressure regulation and the duration of the regulation. However, by increasing current to the solenoid at any time, valve sealing can be reestablished to resume traditional injection functions. Additionally, by controlling the initial injection rate in diesel engines, the initial combustion rates may be reduced to lower engine noise or reduce $NO_x$ emissions. Furthermore, by regulating the maximum injection pressure, the cam and plunger associated with the injector assembly may be sized to provide high injection pressures at low speed and load thereby improving fuel economy and reducing soot formation while, at the same time, preventing excessive structural loads at higher speeds and loads through the pressure regulation function. Finally, the depressurization rate of the fuel injector may also be accurately controlled. More specifically, by reducing the depressurization rate or spill rate, the mechanically-induced engine noise caused by the rapid unloading of the drive system may be reduced. This feature is achieved by the present invention through lowering the current to the solenoid at the end of the injection event thereby slightly unseating the valve member prior to fully terminating the current to the solenoid. By regulating the current to the solenoid at the end of the injection event, the accelerating forces acting on the valve member in the valve opening direction may be reduced resulting in reduced depressurization rates.

The invention has been described in an illustrative manner. It is to be understood that the terminology which has been used is intended to be in the nature of words of description rather than limitation.

Many modifications and variations of the invention, as well as equivalents thereof, are possible in light of the above teachings. Therefore, within the scope of the appended claims, the invention may be practiced other than as specifically described.

What is claimed is:

1. A method for controlling injection rate and injection pressure of a liquid fuel injector having a nozzle assembly and an injector plunger in an injector cylinder for developing nozzle assembly injection pressure, a pressure balanced control valve assembly including a valve body with a valve bore defining a valve seat, a movable valve element in the valve bore with a valve head on the movable valve element, the valve head and the valve seat defining a liquid fuel flow opening, the movable valve element communicating with a pressure regulated nozzle passage whereby the valve element is subject to injection pressure developed by the fuel injector plunger when it is stroked during an injection event, the valve seat and the valve head defining in part a fluid pressure spill passage communicating with the pressure regulated nozzle passage, the spill passage communicating with a fluid supply passage whereby the injector cylinder is supplied with liquid fuel when the fuel injection plunger is retracted, a solenoid actuator for the movable valve element, the valve seat and the valve head being normally open with the solenoid de-energized, and a spring acting on the valve element to oppose a solenoid actuator force; the method comprising the steps of:

providing a first level of regulated current to the solenoid actuator to activate the movable valve element causing the valve head to move toward the valve seat to a first pressure regulating position defining a reduced liquid fuel flow opening whereby the spill flow passage has a first degree of fuel flow restriction thereby allowing regulated injection pressure in the nozzle assembly to rise and creating an initial liquid fuel injection pulse in an initial injection rate-controlled fuel injection period;

providing a second reduced level of regulated current to the solenoid actuator for a preselected time following the initial liquid fuel injection pulse during an injection event to move the valve head away from the valve seat to a second pressure regulating position and to define an increased liquid fuel flow opening thereby creating a reduced initial injection pressure during the initial injection rate-controlled period; and providing a third level of regulated current at a value to cause the valve head to move toward the valve seat to a third pressure regulating position to define a decreased liquid fuel flow opening thereby creating a high third injection pressure regulating position that allows regulated injection pressure in the nozzle assembly to rise further during a main injector rate-controlled fuel injection period and to create a peak injection pressure pulse near the end of the injection event.

2. The method set forth in claim 1 wherein the step of providing a third level of regulated current includes the step of maintaining the third level of regulated current during the main injection rate-controlled fuel injection period, thereby maintaining the peak injection pressure pulse for a precalibrated time near the end of the injection event.

3. The method set forth in claim 2 wherein the step of providing the third level of regulated current is followed by the step of controlling depressurization of the nozzle assembly at the end of the main injection rate-controlled period.

4. The method set forth in claim 3 wherein the step of providing the third level of regulated current is preceded by a step of increasing the regulated pressure at a controlled rate following the initial injection rate-controlled period.

5. The method set forth in claim 3 wherein the step of controlling depressurization of the nozzle assembly comprises the steps of reducing the level of current to a first lower depressurization control level following the step of providing the third level of regulated current and reducing the level of current further to a second lower depressurization control level thereby terminating the injection event.

6. The method set forth in claim 4 wherein the step of controlling depressurization of the nozzle assembly comprises the steps of reducing the level of current to a first lower depressurization control level following the step of providing the third level of regulated current and reducing the level of current further to a second lower depressurization control level thereby terminating the injection event.

7. A method for controlling injection rate and injection pressure of a liquid fuel injector having a nozzle assembly and an injector plunger in an injector cylinder for developing nozzle assembly injection pressure when it is stroked, a pressure-balanced control valve including a solenoid actuator and a valve element subject to pressures developed by the injector plunger, the valve element being actuated by the solenoid to apply a force on the valve element for metering fuel flow to the injector nozzle assembly, a valve spring acting on the valve element and opposing a solenoid actuator force, the valve element having a valve head surrounded by a valve seat and defining with the valve seat a fuel flow spill passage, the valve element controlling the injection pressure between an initial pressure and a maximum pressure, the method including the steps of:

providing a first level of current to the solenoid actuator for moving the valve element from a normally open position toward a closed position to a first pressure regulating position allowing injection pressure to rise in an initial rate-controlled period;

providing a reduced level of current to the solenoid actuator following the initial rate-controlled period to reduce the force on the valve element and to move the valve head away from the valve seat, thereby regulating the pressure to reduce the rate of injection of the fuel as the valve element assumes a second pressure regulating position;

providing an increased level of current to the solenoid actuator following the initial rate-controlled period for moving the valve element toward its closed position to a third fuel pressure regulating position to effect increased pressure regulation and a peak injection pressure value during a peak injection rate-controlled period;

providing a further reduced level of current to the solenoid actuator following the peak injection rate-controlled period to move the valve element under spring force to a depressurization position; and ending solenoid actuator current delivery thereby moving the valve away from the valve seat to its fully open position at the end of an injection event.

\* \* \* \* \*